(12) United States Patent
Drexlmaier

(10) Patent No.: US 6,452,299 B2
(45) Date of Patent: Sep. 17, 2002

(54) MOTOR HAVING A PLAIN BEARING FOR ADJUSTING AN AXIAL PLAY OF A ROTOR SHAFT AND ASSOCIATED METHOD THEREFOR

(75) Inventor: Thomas Drexlmaier, Wuerzburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/793,960

(22) Filed: Feb. 28, 2001

Related U.S. Application Data

(63) Continuation of application No. PCT/DE99/02694, filed on Aug. 27, 1999.

(30) Foreign Application Priority Data

Aug. 31, 1998 (DE) .......................................... 198 39 640

(51) Int. Cl.[7] .................................................. H02K 5/00
(52) U.S. Cl. ........................... 310/91; 310/90; 384/204
(58) Field of Search ..................... 310/91, 90; 384/129, 384/153, 119, 202

(56) References Cited

U.S. PATENT DOCUMENTS

| | | |
|---|---|---|
| 2,912,290 A | 11/1959 | Shaffer |
| 3,770,990 A | 11/1973 | Winkelmann |
| 4,589,155 A * | 5/1986 | Ide .............................. 384/117 |
| 4,806,025 A | 2/1989 | Kamiyama et al. |
| 5,254,893 A * | 10/1993 | Ide .............................. 310/90 |
| 6,183,138 B1 * | 2/2001 | New ........................... 384/308 |

FOREIGN PATENT DOCUMENTS

| | | |
|---|---|---|
| DE | 16 13 179 A | 7/1970 |
| DE | 2 59 504 A1 | 8/1988 |
| DE | 37 21 757 A | 1/1989 |
| EP | 0 592 303 A | 4/1994 |
| FR | 1 485 078 | 9/1967 |
| GB | 2016093 A | 9/1979 |

* cited by examiner

Primary Examiner—Nicholas Ponomarenko
Assistant Examiner—Thanh Lam
(74) Attorney, Agent, or Firm—Sughrue Mion, PLLC

(57) ABSTRACT

In order to simplify the adjustment of an axial play of a rotor shaft (2.4) between the rotor shaft (2.4) and a stator (1) of a motor with the purpose of reducing the component expenditure and the assembly expenditure of the motor, respective clamp holders (3;4) exert pressure on both sides of a plain bearing (5). These clamp holders (3;4) are axially moved to respective operating end positions in a bearing receiver (1.1;7.1). There, the clamp holders (3;4), which have different spring stiffniess, are fixed by respective claws. The clamp holder (3) which has the higher spring stiffness adjusts the axial play of the rotor shaft (2.4) while the clamp holder (4) which has the lower spring stiffness exerts, in particular, an elastic axial pressure against the plain bearing (5) and, therefore, against the first clamp holder (3).

12 Claims, 2 Drawing Sheets

MOTOR HAVING A PLAIN BEARING FOR ADJUSTING AN AXIAL PLAY OF A ROTOR SHAFT AND ASSOCIATED METHOD THEREFOR

This is a Continuation of International Application PCT/DE99/02694, with an international filing date of Aug. 27, 1999, which was published under Article 21(2) in German, and the complete disclosure of which is incorporated into this application by reference.

FIELD OF AND BACKGROUND OF THE INVENTION

The present invention relates to a motor having a plain bearing, especially a cup and ballbearing, for a rotor shaft whose axial play is adjusted. The invention also relates to an associated method for adjusting the axial play of the rotor shaft.

The rotor shafts of mass-produced motors, whose stators include several components, may have an impermissible axial play. The axial play may be too high due to tolerances of the individual components of the motor. Therefore, when the motor is assembled, there is a need in the art to adjust this axial play of the rotor shaft to a pre-defined permissible range.

European Patent Application EP 0 592 303 A1 discloses a motor, which has a cup and ballbearing. The cup and ballbearing can be adjusted axially in a bearing receiver by means of a single clamp holder. In its operating end position, the cup and ballbearing can be fixed by a claw. To do this, the single clamp has two types of radial fingers distributed around its circumference. Specifically, fingers that are bent inward to hold the plain bearing in an embracing manner alternate with fingers having claw ends that project radially outward to fix the clamp in the bearing receiver.

U.S. Pat. 3,770,990 teaches a bearing arrangement for a shaft. A spherical cap is mounted on each end of the shaft. Each of the spherical caps, which contact respective clamp holders, is divided in two axial parts. Together with the shaft, one of the parts of a respective spherical cap can be rotated relative to the other, resting part in order to compensate for any radial play.

German Patent DD 259 504 A1 teaches a fastening for plain bearings that compensates axle displacements, wherein the plain bearings are located in plastic end shields. In this method, a pendulum plain bearing is, on one of its axial face sides, fixed in axial direction by means of a pressure disk that is held in a bearing shaft. At its other axial face side, the pendulum plain bearing is pressed, with elastic stress, against a spherical ring surface of the end shield.

OBJECTS OF THE INVENTION

It is one object of the present invention to provide a simpler adjustment of an axial play of rotor shafts of mass-produced motors in order to reduce the expenditure for manufacturing and assembling these motors. A further object is to provide a simple adjustment for motors in which the respective rotor shaft is rotatably borne in a plain bearing, in particular a cup and ballbearing, while an optimal damping of axial vibrations of the rotor and an operationally safe adjustment of the plain bearing is ensured. While the present invention is not limited to a specific type of plain bearing, it is another object that the simplified adjustment is suitable if the plain bearing is embodied as a spherical cap, for example.

SUMMARY OF THE INVENTION

According to one formulation of the present invention, these and other objects are achieved by a motor which has a plain bearing to adjust an axial play of a rotor shaft of the motor. The motor includes a stator; a first clamp holder which is arranged at one axial face side of the plain bearing; and a second clamp holder which is arranged at the other axial face side of the plain bearing. Therein, the spring stiffness of the first clamp holder is higher than the spring stiffness of the second clamp holder. A bearing receiver receives the first clamp holder, the second clamp holder, and the plain bearing. The first clamp holder and the second clamp holder are, independently of each other, moved to a respective operating end position in the bearing receiver, where they are fixed. Therein, the first clamp holder contacts the one axial face side of the plain bearing in order to adjust the axial play between the rotor shaft and the stator of the motor, wherein the rotor shaft is borne in the plain bearing. The second clamp holder contacts the other axial face side of the plain bearing in order to exert an elastic pressure against the plain bearing and against the first clamp holder.

According to another formulation of the present invention, these and other objects are achieved by a method for adjusting an axial play of a rotor shaft of a motor. In a first step of the method according to the present invention, the rotor of the motor is positioned relative to the motor housing. In a second step, the bearing receiver is fixed relative to the motor housing in that, at the axially inner end of the bearing receiver, the second clamp holder is inserted in the bearing receiver and moved to a second operating end position, where the second clamp holder is fixed. At the axially outer end of the bearing receiver, the plain bearing and the first clamp holder are axially inserted into the bearing receiver. The first clamp holder is moved to a first operating end position in order to adjust a pre-defined axial play of the rotor shaft. At the first operation end position, the first clamp holder is fixed.

Using very simple, standard clamps, the motor according to the invention permits a simple adjustment of the axial play of the rotor shaft of the motor. The axial play adjustment is carried out by axially displacing the first clamp holder when the motor is assembled. Thereby, an adjustment over even long axial adjusting paths is achieved. At the same time, an optimal damping of axial vibrations is ensured. Due to the provision of the second, easily-to-install clamp holder, whose spring characteristic is designed independently of the first clamp holder, the danger of a loose plain bearing is avoided. The plain bearing can be a spherical cap, for example. In a particularly simple manner in terms of manufacturing the clamp holders, each clamp holder includes a clamp that has a radially outer, closed clamping edge. Furthermore, fingers, which project inwardly from the clamping edge, touch the plain bearing.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF THE PREFERRED EMBODIMENTS

Figure 1:
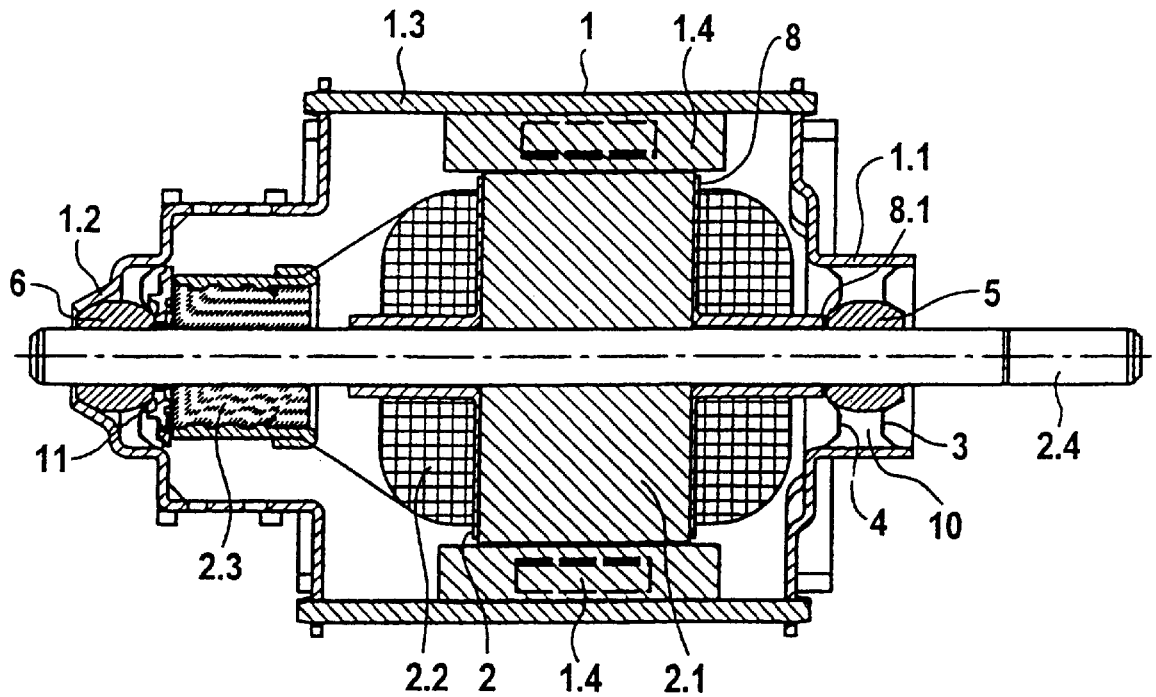
FIG. 1 is an axial cross section of a commutator motor having a bearing receiver which is held at the right axial end of the motor housing via an end shield, wherein the bearing receiver includes clamp holders according to the present invention for a plain bearing, in particular a spherical cup and ballbearing.

FIG. 1 shows an axial cross section of a commutator motor that is excited by a permanent magnet. Such a motor is used, for example, to drive fans in motor vehicles. On the inner circumference of a motor housing 1.3, a stator 1 has magnetic shells 1.4 to permanently excite the commutator motor. In addition, the stator 1 has bearing receivers 1.1; 1.2 that are mounted on respective axial ends of the motor housing 1.3.

A rotor 2 includes a rotor package 2. 1, which is held on a rotor shaft 2.4. A winding 2.2 is connected to a commutator 2.3, which is brushed by brushes that are not shown. The rotor shaft 2.4 is rotatably borne in a right plain bearing 5 on an AS side of the motor and in a left plain bearing 6 on a BS side of the motor. The plain bearings 5, 6 can be spherical caps, for example. In a conventional manner, one axial end of the left spherical cap is pressed against the fixed bearing receiver 1.2 by a clamp 11. Preferably, the fixed bearing receiver 1.2 is embodied in a ball socket shape.

According to the invention, the right spherical cap 5 is held in the bearing receiver 1.1 by a first clamp holder 3, which is arranged or surface-mounted in the area of the right axial end of the right spherical cap, and by a second clamp holder 4, which is arranged or surface-mounted in the area of the left axial end of the right spherical cap 5. Preferably, the bearing receiver 1.1 has a cylindrical form in this area. The spherical cap 5 is held in the bearing receiver 1.1 in such a way that the right spherical cap 5 can be axially adjusted. A lubricant deposit reservoir 10 is provided between the first clamp holder 3 and the second clamp holder 4 to lubricate the contact area between the spherical cap 5 on the one hand and the first clamp holder 3 and the second clamp holder 4 on the other.

Figure 4:
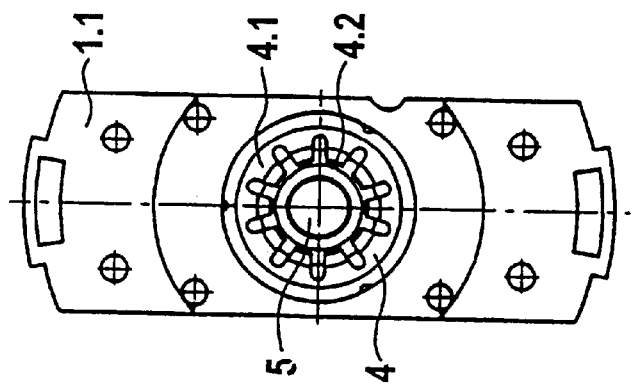
FIG. 4 is a rotor-side axial top view of a second clamp holder having a low spring stiffness.
Figure 3:
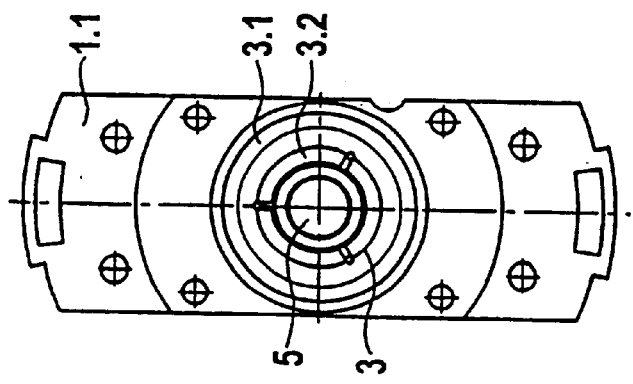
FIG. 3 is an axial top view toward a first clamp holder having a high spring stiffniess.

The two clamp holders 3 and 4 have different spring characteristics. The first clamp holder 3, which is arranged at the axially outer side, has a steep spring characteristic curve. The second clamp holder, which is arranged at the axially inner side, has a flatter spring characteristic curve. The different spring characteristics are determined by the number and the design of radially inner fingers, which are preferably formed on respective radially outer clamping edges 3.1; 4.1 of the clamp holders 3; 4, as shown in FIGS. 3 and 4. Since the clamp holder 3 has a relatively high stiffniess, the clamp holder 3 shown in FIG. 3 has only a few, e.g. three, fingers 3.2 and/or the finger area that is radially inside relative to the outer clamping edge 3.1 has only short slits. As shown in FIG. 4, the second clamp holder 4, has, in accordance with its relatively soft spring characteristic, a total of ten narrower fingers 4.2, which are formed from the single-piece clamp by greater and deeper slits.

The desired range for the axial play is determined by the depth of the axial insertion of the right first clamp holder 3 into the bearing receiver 1.1. This range for the axial play is defined, for example, by an axial contact path between the left front face of the plain bearing 5 and the opposing front face 8.1 of an isolating end disk 8, which is fastened to the rotor package. When the spherical cap 5 is moved axially to adjust the axial play of the rotor shaft 2.4 by means of the first clamp holder 3, the fingers 4.2 of the left second clamp holder 4 yield in a more or less resilient manner. Therein, the second clamp holder 4 has a flat spring characteristic curve. At the same time, the left second clamp holder 4 remains fixed in its pre-assembled and adjusted axial position. Advantageously, the relatively flat spring characteristic of the inner second clamp holder 4 is used, among other things, to ensure that the spherical cap 5 is received in the bearing receiver 1.1 in such a way that the spherical cap 5 is secured against turning. By the same token, the relatively flat spring characteristic makes the second holder 4 soft enough to permit the spherical cap 5, which is received in the bearing receiver 1.1, to be adjusted in order to compensate misalignments.

In the operating end position of the spherical cap 5, the spherical cap 5 is pressed against the axially outer first clamp holder 3 by the resilient fingers 4.2 of the axially inner second clamp holder 4. Since the first clamp holder 3 has a steep spring characteristic curve, the fingers 3.2 of first clamp holder 3 practically do not yield in the axial direction. Thus, the spring characteristic curve of the axially inner second clamp holder 4 is not adequate to push the axially outer first clamp holder 3 back. Preferably, the spring characteristic curve of the outer first clamp holder 3 is designed in such a way that it can damp axial strains of the rotor shaft, just like the axial inner second clamp holder 4 does in the opposite direction. These axial strains are due to strong magnetic axial tension and/or due to strong axial mechanical shock, for example.

Preferably, in order to achieve an especially simple axial play adjustment by means of the two clamp holders 3; 4, which have different spring characteristic curves, the axially inner second clamp holder 4 is pre-assembled at an operating end position in the bearing receiver 1.1. After the bearing receiver 1.1 is attached to the stator 1, which has the rotor already mounted in the stator bore, the spherical cap 5 and the axially outer first clamp holder 3 are inserted into the bearing receiver 1.1. Thereafter, the spherical cap 5 and the axially outer first clamp holder 3 are moved to their respective operating end positions in order to adjust a pre-defined axial play of the rotor shaft 2.4.

In addition to the pre-assembled axially inner second clamp holder 4, the spherical cap and the axially outer first clamp holder 3 are, according to another preferred embodiment of the invention, pre-assembled in the bearing receiver 1.1 too. After fastening the bearing receiver 1.1 at the stator 1 (wherein the rotor 2 was previously positioned in the bearing bore of the stator 1), the spherical cap 5 and the axial outer first clamp holder 3 are further pressed into the bearing receiver 1.1 to adjust the pre-defined axial play of the rotor shaft 2.4.

Figure 5:
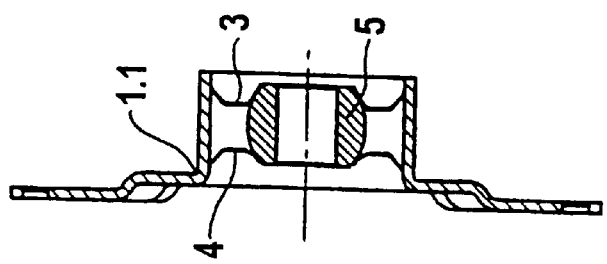
FIG. 5 is an axial cross-sectional view of the two clamp holders according to FIGS. 3;4.

Advantageously, when the clamp holders 3; 4 reach their operating end positions, the clamp holders 3; 4 are fastened in the bearing receiver 1.1 via their respective clamp edges 3.1; 4.1. Preferably, the clamp holders 3; 4 are automatically fastened by means of respective claws. For this purpose, the clamping edges 3.1; 4.1 point in a direction opposite to the insertion direction in order to form the respective claws, as shown in the cross section of FIG. 5.

Figure 2:
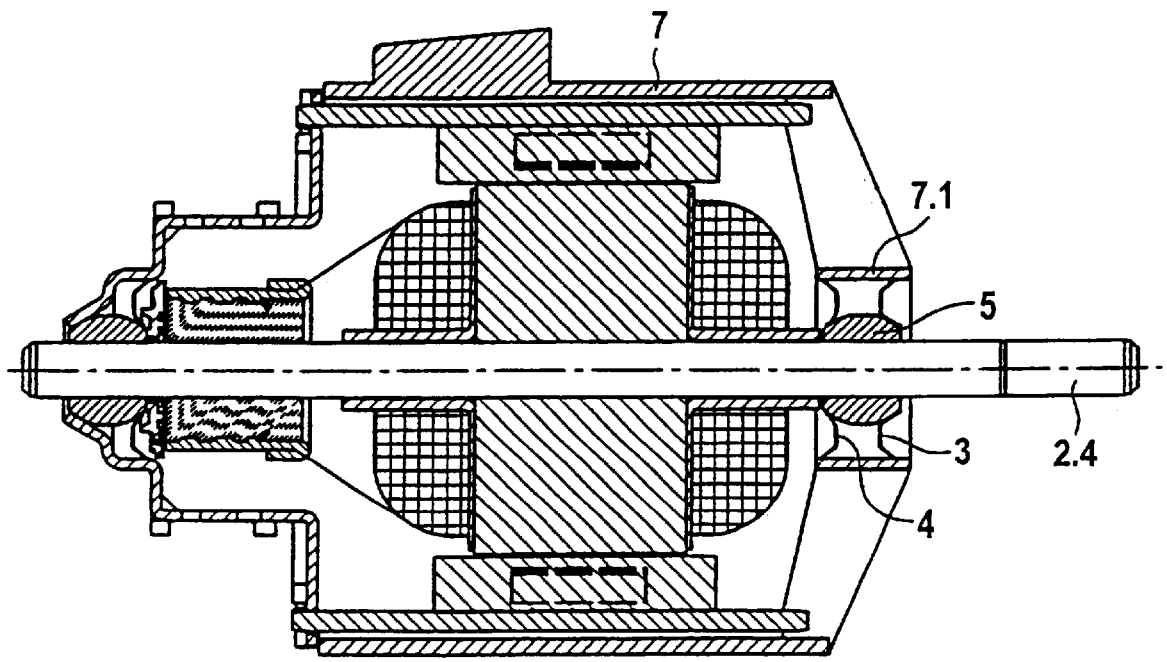
FIG. 2 is an arrangement according to FIG. 1, in which the bearing receiver is part of an adapter receiving the motor housing.

In the preferred embodiment shown in FIG. 2, a bearing receiver 7. 1, which receives the spherical cap 5 and the clamp holders 3; 4, is an integral part of an adapter 7, which receives the motor in an embracing manner. This preferred embodiment is particularly advantageous for pre-assembling the clamp holders 3; 4 according to the present invention. By means of the adapter 7, the motor can be easily installed in a holder, such as a holder of a motor fan assembly in a motor vehicle.

The clamp holders 3; 4 according to the present invention, which are, in the preferred embodiments discussed above, provided on the AS end of the rotor shaft 2.4 can, of course, also or instead be provided on the BS end of the rotor shaft 2.4.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A motor, comprising:

a rotor shaft;

a plain bearing to adjust an axial play of the rotor shaft;

a stator;

a first clamp holder arranged at one axial face side of the plain bearing;

a second clamp holder arranged at another axial face side of the plain bearing; wherein a first spring stiffness of the first clamp holder is higher than a second spring stiffniess of the second clamp holder; and a bearing receiver to receive the first clamp holder, the second clamp holder, and the plain bearing;

wherein the first clamp holder and the second clamp holder are structured to be axially moved, independently of each other; to respective operating end positions in the bearing receiver; wherein the first clamp holder and the second clamp holder are configured to be fixed in the respective operating end positions; wherein the first clamp holder is structured to contact the one axial face side of the plain bearing in order to adjust the axial play between the rotor shaft and the stator of the motor; wherein the rotor shaft is borne in the plain bearing; and wherein the second clamp holder is structured to contact the other axial face side of the plain bearing in order to exert an elastic pressure against the plain bearing and against the first clamp holder.

2. The motor according to claim 1, wherein the plain bearing comprises a ballbearing.

3. The motor according to claim 1, wherein the first clamp holder is arranged at an axial outer end of the plain bearing; and wherein the second clamp holder is arranged at an axial inner end of the plain bearing.

4. The motor according to claim 1, wherein each of the first clamp holder and the second clamp holder has a respective radially outer closed clamp edge; wherein respective fingers, which project radially inwardly from the respective radially outer closed clamp edges, contact the plain bearing; and wherein the first spring stiffness of the first clamp holder and the second spring stiffness of the second clamp holder are determined by at least one of a number of and a design of the respective fingers.

5. The motor according to claim 1, further comprising respective claws in the bearing receiver, wherein the respective claws are configured to fix the first clamp holder and the second clamp holder in the respective operating end positions; and wherein the respective claws point toward the plain bearing.

6. The motor according to claim 1, wherein the bearing receiver is part of a bearing clip that is connected with a housing of the motor.

7. The motor according to claim 1, wherein the bearing receiver is part of an adapter that is structured to receive the motor.

8. The motor according to claim 7, wherein the adapter is structured to receive and embrace a housing of the motor.

9. The motor according to claim 1, further comprising a lubricant deposit reservoir that is arranged between the first clamp holder and the second clamp holder.

10. A rotor shaft bearing arrangement, comprising:

a rotor shaft;

a bearing supporting the rotor shaft;

a first and a second clamp holder arranged respectively on opposite axial sides of the bearing; wherein the first clamp holder has a greater spring stiffness than the second clamp holder and wherein the first and the second clamp holders, through their respective spring stiffnesses, exert elastic pressure against the bearing in mutually opposite axial directions; and a bearing receiver supporting the first clamp holder, the second clamp holder, and the bearing.

11. The rotor shaft bearing arrangement according to claim 10, wherein each of the first clamp holder and the second clamp holder has a respective radially outer closed clamp edge; and wherein respective fingers, which project radially inwardly from the respective radially outer closed clamp edges, contact the bearing.

12. The rotor shaft bearing arrangement according to claim 11, wherein the respective spring stiffaesses are determined by at least one of a number of and a design of the respective fingers.

* * * * *